(12) United States Patent
Edmonds

(10) Patent No.: US 7,231,406 B2
(45) Date of Patent: Jun. 12, 2007

(54) FAULT-TOLERANT QUEUE WITH AUTONOMOUS CLIENT OPERATION

(75) Inventor: Paul Edmonds, Palo Alto, CA (US)

(73) Assignee: Openwave Systems Inc., Redwood City, CA (US)

( * ) Notice: Subject to any disclaimer, the term of this patent is extended or adjusted under 35 U.S.C. 154(b) by 529 days.

(21) Appl. No.: 10/785,521

(22) Filed: Feb. 24, 2004

(65) Prior Publication Data

US 2004/0167932 A1 Aug. 26, 2004

Related U.S. Application Data

(63) Continuation of application No. 09/945,358, filed on Aug. 31, 2001, now Pat. No. 6,718,327.

(51) Int. Cl.
G06F 17/30 (2006.01)
G06F 15/16 (2006.01)

(52) U.S. Cl. .................... 707/200; 707/201; 709/229

(58) Field of Classification Search ................. None
See application file for complete search history.

(56) References Cited

U.S. PATENT DOCUMENTS

| | | | |
|---|---|---|---|
| 5,426,424 A * | 6/1995 | Vanden Heuvel et al. . | 340/7.52 |
| 5,623,666 A | 4/1997 | Pike et al. | |
| 5,928,333 A * | 7/1999 | Landfield et al. ........... | 709/245 |
| 6,389,433 B1 | 5/2002 | Bolosky et al. | |
| 6,535,855 B1 | 3/2003 | Cahill et al. | |
| 6,985,956 B2 * | 1/2006 | Luke et al. .................. | 709/229 |
| 2002/0055950 A1 | 5/2002 | Witteman | |
| 2002/0120763 A1 | 8/2002 | Miloushev et al. | |
| 2003/0056069 A1 * | 3/2003 | Cabrera et al. ............. | 711/161 |

OTHER PUBLICATIONS

U.S. Appl. No. 09/945,358, Paul Edmonds.
Paul Leach and Dan Perry, "CIFS: A Common Internet File System," http://www.microsoft.com/mind/1196/cifs.htm, Nov. 1996.
SNIA CIFS Documentation Work Group. "Common Internet File System (CIFS), Version; CIFS-Spec 0.9," SNIA (Storage Network Industry Association), Revision Date Mar. 26, 2001.

* cited by examiner

*Primary Examiner*—Jeffrey Gaffin
*Assistant Examiner*—Hassan (Tony) Mahmoudi
(74) *Attorney, Agent, or Firm*—Townsend and Townsend and Crew LLP

(57) ABSTRACT

Apparatus and methods, including computer program products, for providing a network-accessible queue. The queue is stored on a network-accessible file system having a locking mechanism providing strictly-enforced, network-wide file locking. The data structures of the queue are stored in the file system. The file system is preferably implemented on a network accessible RAID array storage device providing a native CIFS file system for storing queue entries received over a network from sender clients and for delivery of such queue entries to receiver clients. Synchronization is implemented using file locks enforced by the file system, so there is no need for a master synchronization process. Notification of the availability of queue entries to receiver clients is also done by a decentralized process.

14 Claims, 3 Drawing Sheets

FAULT-TOLERANT QUEUE WITH AUTONOMOUS CLIENT OPERATION

RELATED APPLICATIONS

The present application is a continuation of co-pending and commonly assigned U.S. patent application Ser. No. 09/945,358, filed Aug. 31, 2001, now U.S. Pat. No. 6,718,327 and entitled "FAULT-TOLERANT QUEUE WITH AUTONOMOUS CLIENT OPERATION," the disclosure of which is hereby incorporated herein by reference.

BACKGROUND

The invention relates to a distributed queuing system, such as a system providing timed delivery of messages.

Distributed message queue systems are currently available, including several commercial solutions such as IBM's Message Queue (MQ) Series and Microsoft's Message Queue Server (MSMQ). However, the existing systems invariably involve a centralized server or process for control of the queue. Therefore, there is a need for a system utilizing decentralized processes.

SUMMARY

The invention provides a queuing system using decentralized processes for coordinated access to queue entries. It offers decentralized synchronization and notification mechanisms by use of a library of queue access methods operating against a remote file system access protocol, such as the CIFS (Common Internet File System) protocol, that provides enforced, network-wide file locking processes. Implementing synchronization using such file-locking processes avoids any need for a master synchronization process. The queue is accessed by clients (by which is meant client applications running on nodes on a network) that communicate with the queue through coordinated access of the queue data structures, which are stored on a remote file system implementing the remote file system access protocol.

The invention provides methods for adding and removing entries from a queue. The methods are invoked by clients separately; that is, each client operates autonomously and independently of all other clients, and there is no master process operating to synchronize access to the queue. Because the clients operate autonomously, no client is dependent on the continued operation of any other client, and there is no need to provide failover to handle client failures. If a client fails, the only consequence is that the system loses a corresponding amount of processing capacity.

The invention is preferably implemented with the file system running on a network-attached RAID (Redundant Array of Independent Disks) array storage device that maintains file locks on the RAID controller. Such network attached storage (NAS) devices include the NetApp Filer products available from Network Appliance, Inc. of Sunnyvale, Calif., with a 4.0 release or later of NetApp® Data ONTAP™ operating system software, which implements the CIFS protocol as a native file system protocol. With this implementation, the file system locks are arbitrated on the NAS device controller, which implements CIFS, rather than by a master client or some master arbitration agent, which would have to be protected by some kind of failover mechanism.

With the file system implemented by an NAS device and the clients programmed to operate autonomously, the queue system has no single point of failure, providing a high degree of reliability without having to rely on any specialized hardware or software recovery.

Furthermore, the invention provides a notification mechanism that notifies and wakes up all receivers when an entry newly appears or becomes available for processing in the queue, so that all receivers will attempt to process the entry. Such a notification mechanism allows the clients to operate autonomously, because no assumption is made as to which individual client will handle or process a particular queue entry.

Some of the advantages that can be realized by particular implementations of the invention are listed below.

Fault Tolerance: The invention offers the advantages of persistence and fault tolerance, which are accomplished by maintaining the queue data structures as files on a redundant networked storage device. Many critical faults may occur during normal operation of the queue—such as a disk drive failure, a network failure, or software problems such as resource corruption—interfering directly or indirectly with the operation of the queue clients. By storing the persistent (on-disk) data on fault tolerant storage, hardware failure impact is minimized, freeing the queuing system from any need for special hardware recovery. For example, if a hard disk holding a queue fails, the storage device has built-in redundancy to enable an immediate backup or to provide a secondary copy of the queue data. Thus, the integrity of the queue is ensured. In addition, the queue is not affected by a software fault such as an unexpected process termination. A persistent copy of the queue data remains unchanged and thus software faults do not affect the operation nor corrupt the state of the queue.

Cluster-Wide Accessibility: The queue data structures are stored on a high-speed network-accessible data store, which makes the queue accessible from any client that can communicate with the data store. As long as a client application can identify the queue it wishes to access by a globally unique identifier, coordinated access is possible.

Multi-Client Access: Any number of client applications can access a queue almost simultaneously. The suite of methods provided to perform queue operations can be divided into three general categories: addition methods, removal methods, and administrator methods. (In the time queue implementation that will be described later, these are called sender methods, receiver methods, and administrator methods.) File locks are used to synchronize access to the queue data structures. It is required that the file system provide file locks that are strictly enforced, meaning that if one client on node A locks the queue for a given operation, another client application on node B will not be able to access it until the client on node A releases its lock.

High Performance: Another advantage of the invention is its high performance. A queue can be implemented so that entries can be added to a queue not only at the tail of the queue, but also within the queue according to a priority associated with the entry when it is added. In an implementation of a time queue, for example, messages (which would be the queue entries) are inserted in ascending order of their delivery times (which would be, in effect, their queue priorities), so that the receiving clients can simply pop the top message off the time queue for processing instead of having to traverse the queue for the next message to be processed. This allows the time queue to handle requests from many clients at any given time, even when there are a significant number of messages in the time queue with the same delivery time. When the queue data structures include a kernel file that stores entries using an indexed scheme, a receiving client read the entry data directly using its offset in the kernel file.

The details of one or more embodiments of the invention are set forth in the accompanying drawings and the description below. Other features and advantages of the invention will be apparent from the description and drawings, and from the claims.

BRIEF DESCRIPTION OF DRAWINGS

Like reference numbers and designations in the various drawings indicate like elements.

DETAILED DESCRIPTION

This invention can be implemented using a file system supporting a CIFS protocol, such as the protocol described in Storage Networking Industry Association, SNIA CIFS Documentation Work Group, Common Internet File System (CIFS) Version: CIFS-Spec 0.9, Draft Work-in-Progress, dated Mar. 26, 2001. CIFS defines a remote file system access protocol for use over a network, such as the Internet or a company intranet, enabling groups of users to work together and share documents across the network. CIFS is a cross-platform technology based on the widely-used Server Message Block (SMB) protocol. The implementation of the invention that will be described employs existing structures in CIFS and builds on top of these structures to implement a time queue.

Physically, in a preferred embodiment, the queuing system is implemented as a set of files and directories on an NAS device and one or more client applications on multiple nodes in a network. The implementation includes methods, which will be described later, that are used by clients to access a queue. Thus, a queue is accessible from any node in the network as long as the client applications can identify the queue they wish to access by a globally unique identifier. The globally unique identifiers can be stored in a directory service database, such as an LDAP or other directory service, that acts as the central source for hardware and software information for the entire system. The globally unique identifiers of all the queues in the system can be enumerated from the directory service database, and a client application can use any or all of them depending on that application's responsibility. In other words, each queue has its own set of configuration data and is identified by a unique, system-wide resource descriptor, similar to the named-pipe concept found in most operating systems. This descriptor is used to lookup the queue's configuration parameters in the central directory service database. Multiple clients can access a queue nearly simultaneously, from any node in the network, by using the name of the queue and the queue methods that will be described. These methods can be implemented using any convenient computer programming tools; for example, they can be implemented in a queue handling component that provides an interface for performing the required file operations on the queue data structures in the file system.

The specification will now describe an implementation of a time queue based on the invention. Clients add messages to the time queue with desired delivery times, and clients receive messages from the time queue and process them at their respective desired delivery times or soon thereafter.

Figure 1:
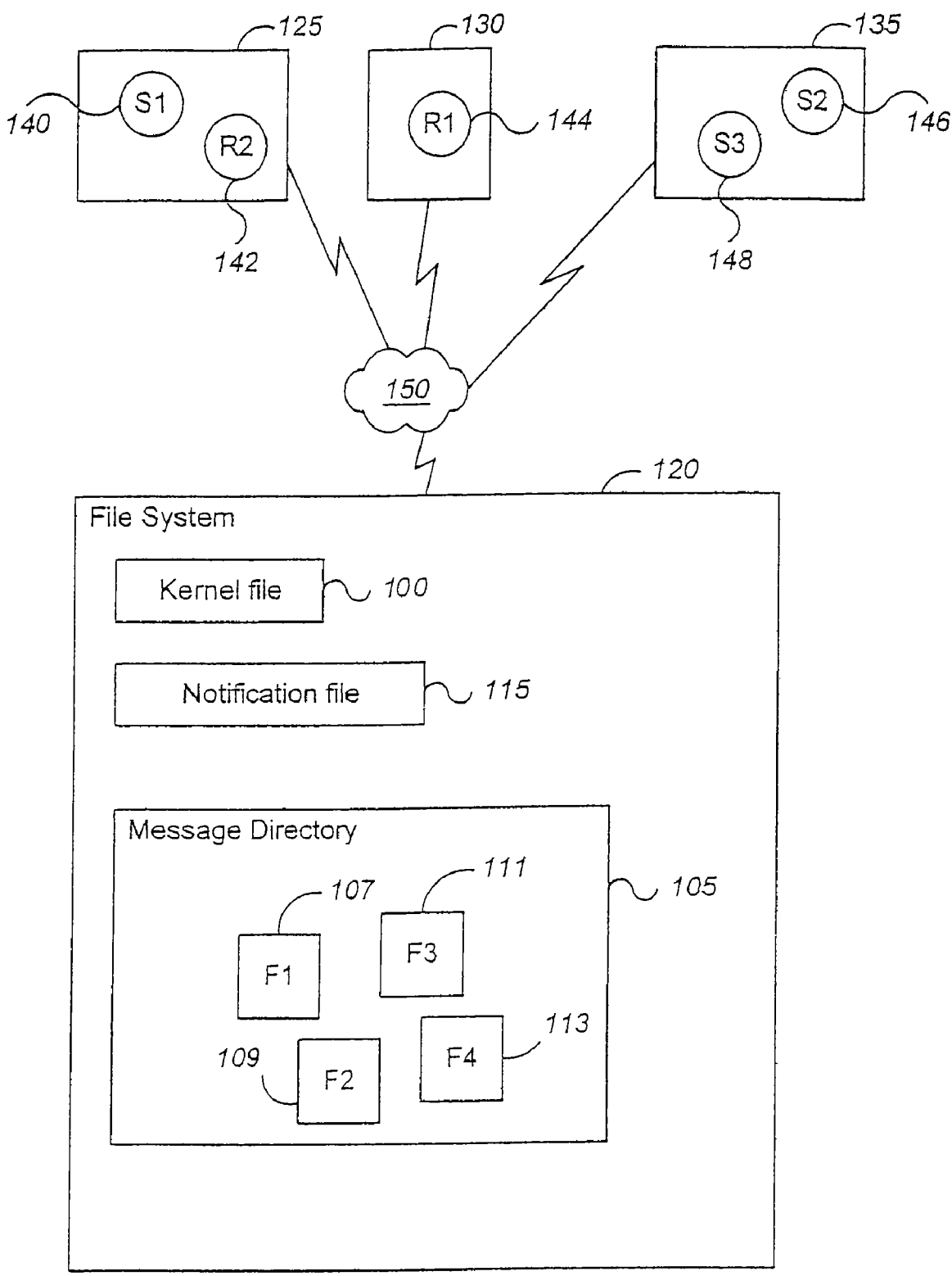
FIG. 1 is a schematic diagram of a system implemented according the principles of the invention.

As shown in FIG. 1, in one implementation of the time queue, there is a kernel file 100, a message directory 105 including files F1 107, F2 109, F3 111, and F4 113, and a notification file 115, all of which reside on file system 120, preferably implemented on an NAS device with RAID storage. The file system 120 is accessible to nodes 125, 130 and 135 over a network 150, which can be any kind of communication network. Each node can include receivers, senders, or a combination of them. Node 125 includes sender S1 140 and receiver R2 142. Node 130 includes receiver R1 144. Node 135 includes senders S2 146 and S3 148.

Figure 2A:
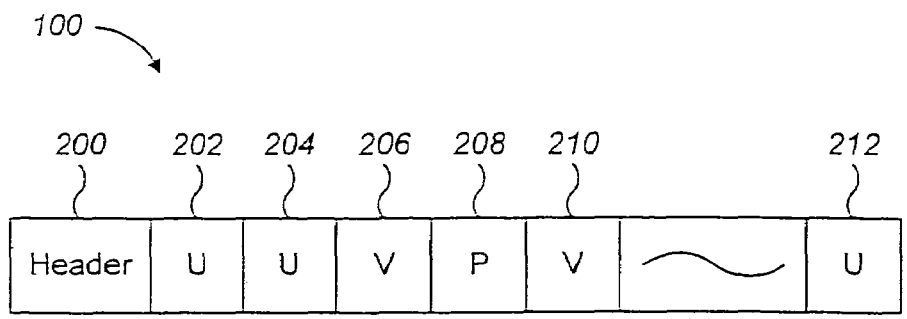
FIG. 2A is a data structure diagram for a kernel file.

Senders such as S 1 140, S2 146 or S3 148 add entries (messages) to a time queue. A sender first creates and initializes a queue entry data structure, i.e., a message. It then sets the desired delivery time and calls the send method. The kernel file 100 has a header 200 and multiple slots 202, 204, 206, 208, 210, 212, as shown in FIG. 2A. The slots are organized into three lists: an unread list, a vacant list, and a pending list. The lists will be explained in more detail below. The send method locks the header 200 of kernel file 100 using the remote file system protocol file-locking process, traverses the list of unread slots to find the correct position for the new entry, inserts the entry into the list, and links the entry to the other unread slots by an index scheme explained below. The send method also posts a notification—which process will be described later—if the delivery time of the new message has already expired (i.e., the delivery time has passed) or is newer than the previous head of the unread list.

Each entry in a time queue has an associated delivery time. Entries are stored in order of ascending delivery time and then, if necessary, in order of arrival. In other words, the first entry in the queue has the delivery time closest to the present time and if multiple entries have the same delivery time then they are inserted in the order in which they arrived.

Because the messages are inserted in ascending temporal order, the receiving clients R1 144, R2 142 can simply pop the top message off the unread list for processing instead of having to traverse the entire kernel file for the next message to be processed. The kernel file 100 stores entries or messages using an indexed scheme; receivers R1 144 and/or R2 142 can read the entry data directly using the value of the offset field in slots in the kernel file 100.

Figures 2B, 2C:
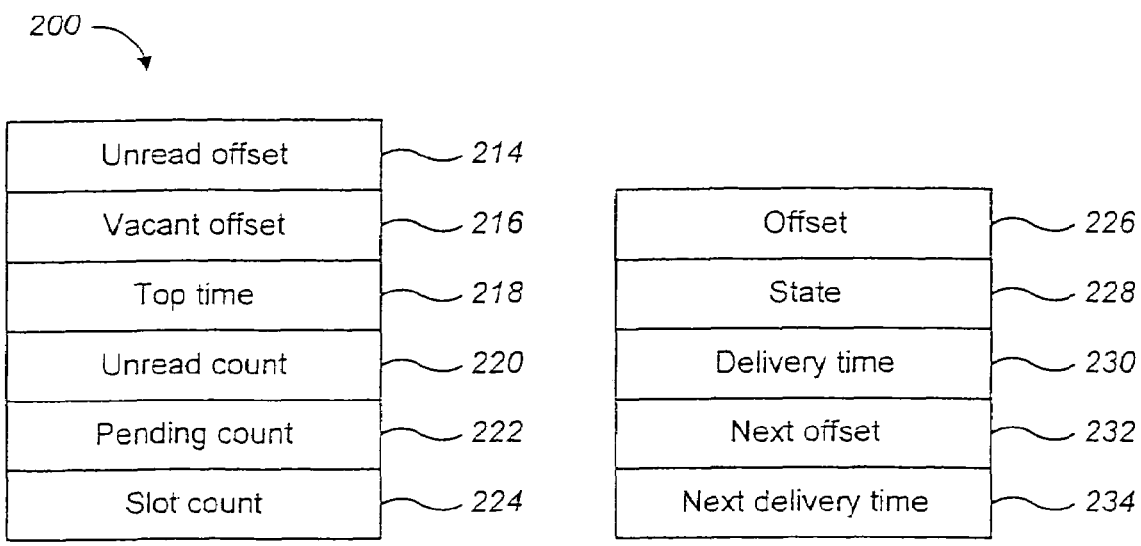
FIG. 2B is a data structure diagram for a header of the kernel file.
FIG. 2C is a data structure diagram for a slot in the kernel file.

As shown in FIG. 2A, the kernel file 100 contains a header 200 and any number of slots. Each slot, in one implementation, can be between 24 to 32 bytes. FIG. 2A shows slots 202, 204, 206, 208, 210, 212. Slots are organized into three lists: an unread list, a vacant list, and a pending list. The structure of the header 200 is illustrated in FIG. 2B. The header 200 contains the state information of the time queue at any time. This state information includes the offset 214 of the first unread slot and the offset 216 of the first vacant slot. A slot is linked into one of the three above-mentioned lists based on the slot's offset in the kernel file 100. The head of a list is really just the unsigned offset of the first slot in the list. The first slot stores the offset of the next slot as its next pointer, and so on. Thus, only the offset of the first slot in each list is stored in the kernel header 200. It is not necessary to keep an offset of the first pending slot for proper functioning of the system because a pending slot is always being processed by a receiver client.

The header 200 further includes the unread count 220, a count of the total number of unread slots in the time queue. The header 200 also includes the pending count 222 and the slot count 224. The unread count 220 plus the pending count 222 should be equal to the total slot count 224. The header 200 also includes the top time 218, which is the delivery time of the message of the first unread slot.

FIG. 2C illustrates the internal structure of a slot. Offset 226 is the address of the slot in the kernel file 100. Every slot has a static ID based on its position or offset in the kernel file. The state 228 of the slot can be either vacant, unread, or pending: The slot also contains a delivery time 230 for its associated message.

The next offset 232 of a slot links the slot to a next slot in the list of its state 228. The delivery time 234 of the next slot in the list is maintained for convenience.

Vacant slots are empty entries in the queue, ready to be reused for new (unread) messages. A sender client takes a slot from the vacant list and inserts a new message in it. Naturally, vacant slots contain no message data and no delivery data.

Unread slots are new entries in the time queue. Such a slot is said to be "unread" because no receiver has either seen or started to process the slot. Each unread slot represents a message that needs to be processed; it has a corresponding message file, in the time queue's message directory 105, containing the body of the message. A sender client obtains a vacant slot from the vacant list and fills the slot with the message and delivery information. A sender client also creates a message file, such as F1 107, in message directory 105 to hold the contents of the message. The slot is then placed in the unread list in order according to its delivery time. The name of the message file can be made to correspond to the slot's unique ID to avoid conflicting names.

A pending slot is a queue entry that is being delivered or being processed. Its delivery time is either the current time or in the past. A slot is pending if a receiver client is currently carrying out the delivery instructions and delivering the data associated with that entry. As soon as the receiver client finishes processing the message, it marks the slot vacant, deletes the associated message file, and places the slot on the vacant list. The cycle repeats as vacant slots become reused for new, unread messages.

Therefore, any slot in kernel file 100 will cycle through these three states in the following order: vacant to unread to pending to vacant.

Figure 3:
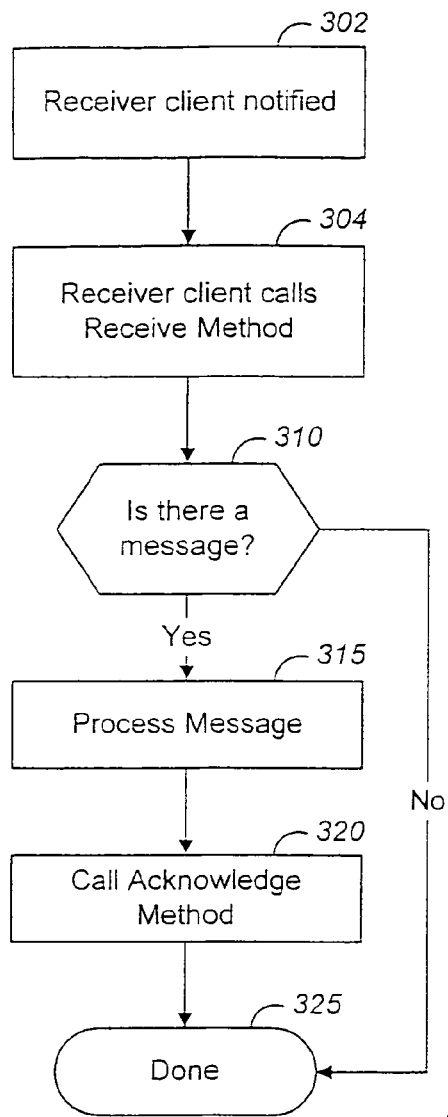
FIG. 3 is a flowchart illustrating a process performed by a receiver client.

As shown in FIG. 3, a receiver client calls (304) the time queue receive method (illustrated in FIG. 4) when the receiver client is notified and awakened (302), as described below. If the receive method provides no message ("No" branch from decision step 310), the receiver client can exit (325) or it can wait, which it can do by called the receive method again, which will block until there is a message. When there is a message, the receiver client processes (315) the message. Once the message is processed, the receiver client calls (320) the acknowledge method (illustrated in FIG. 5) to notify the time queue that it has completed the processing of the entry. The acknowledge method marks the slot in the time queue as vacant (502) and appends (504) it to the vacant list so that a new sender client can use this slot to insert a new message in a time queue. The acknowledge method ensures that the client is registered for notification (506) of changes to the time queue.

If the head of the unread list has already expired, the receiver client will attempt to lock the kernel header 200. As soon as the lock is granted, the receiver client removes the top entry from the unread list and unlocks the kernel header 200 to give other waiting clients access to the kernel file 100. Such other clients may include other receivers able to receive other entries that have expired as well.

Figure 4:
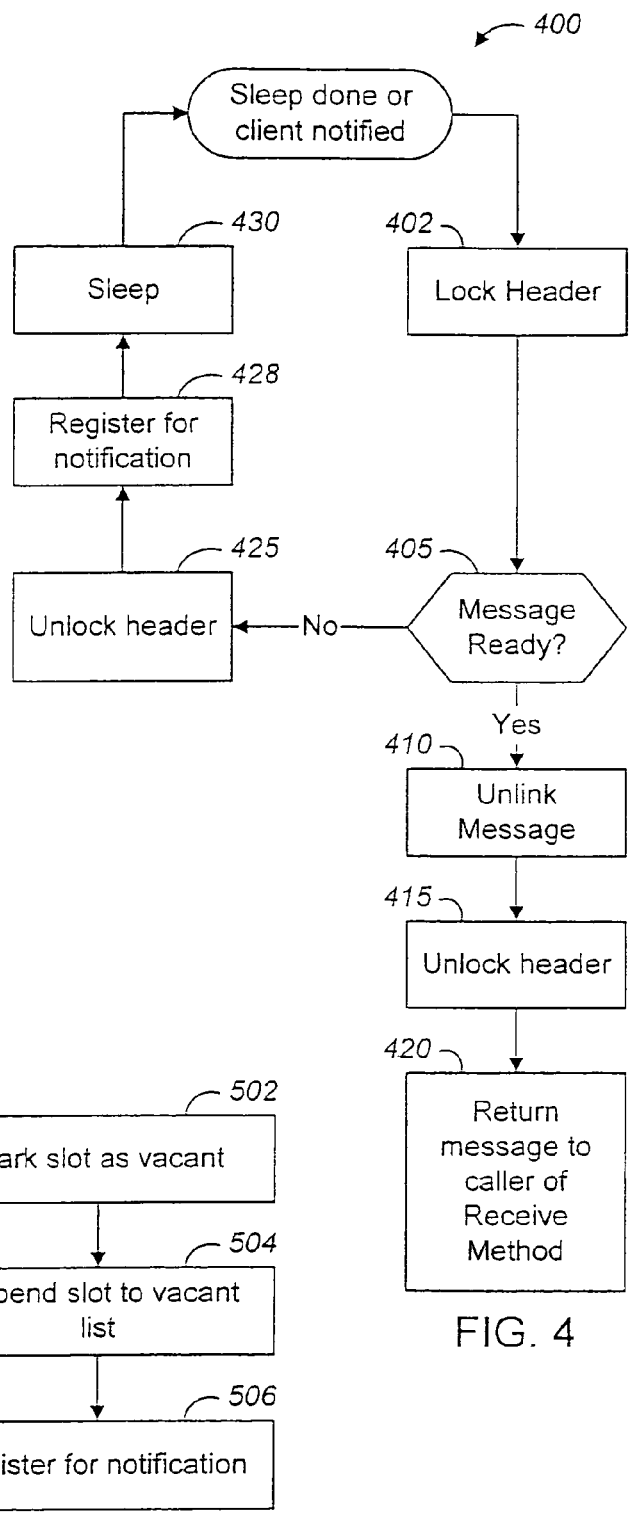
FIG. 4 is a flowchart illustrating a receive method.
Figure 5:
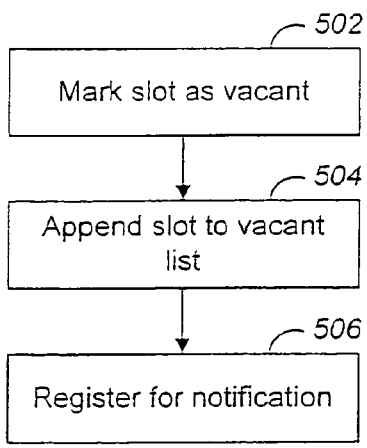
FIG. 5 is a flowchart illustrating an acknowledge method.

FIG. 4 shows steps used by the receive method 400 to remove a message from the queue. The receive method first attempts to lock (402) the header 200. As soon as the lock is granted, the method loads the header into client memory. If a message is ready (405) for delivery, the receive method unlinks (410) the message. Once the operation is completed on the in-memory copy of the time queue data, the updated state of the time queue is then written back to the file system and the receive method unlocks (415) the header before returning control and the message (420) to the receiver client that called the receive method. Unlocking the header gives other waiting clients access to the header, which may include other receivers able to receive other messages. If no message is ready ("No" branch from step 405), the method unlocks the header (425), ensures that it is registered for notification (428) in case a new message should arrive with an earlier delivery time than the earliest in the queue, and goes to sleep (430) as described below.

On any action involving the time queue, the header 200 is first locked, then read, then processed, and finally unlocked. If the operation is a send method operation, the header 200 may be unlocked if the message ends up being inserted somewhere other than at the front of the unread list. In this case, the range of each slot traversed is locked before releasing the lock to the header 200 or the lock to the previous slot in the list.

The time queue has two states, controlled by function calls to Open( ) and Close( ). A client must open the time queue before invoking any other methods and close the time queue when it is no longer needed. An opened time queue has all internal data structures allocated and initialized. An opened time queue also contains a handle to the opened kernel file. A function call to Close( ) will free this handle and clean up the in-memory data structures properly.

If the time queue is open, the kernel file 100 is also open and valid. The kernel file 100 is always opened with generic read and write accesses as well as shared read and write access. All reads and writes are to this open file handle and must be preceded by a lock before processing and followed by an unlock after processing.

If a process failure or resource error occurs at any stage of the in-memory operation, the method unlocks the header 200 and returns an error code and control to the client.

Implementing synchronization using an enforced remote file locking mechanism avoids the need for a master synchronization process. The program logic that handles locking and unlocking of the kernel header 200 and of the slots is provided by the time queue methods, but it is invoked separately by each of the various time queue clients, so there is no master process that creates or enforces synchronization, and each method operates separately and in accessing and manipulating the time queue data structures. Specifically, in a CIFS implementation, the file system will queue up each file lock request in its lock request, effectively blocking all the clients waiting to access the time queue. As each client completes its processing of the queue and unlocks the kernel header 200, the client that is next in line in the lock request queue receives the lock and is unblocked so it can perform its intended operation.

In one implementation, receiver clients are grouped into "classes", where each class is designed to process messages for a given time queue, identified by the unique ID in the directory service database. A receiver client knows the unique ID of the queue it is supposed to process. Thus, messages in a given queue have "intended" receivers, but that information is not stored anywhere in the messages.

The notification process is very similar to the synchronization process discussed above. As shown in FIG. 4, if the next unread message has not yet expired ("No branch of step 405), the receiver client will go to sleep for the exact amount of time between when it checked the next message expiration and the time of the next message expiration. In other words, it will sleep (430) until the next message expires. Before each receiver sleeps, it unlocks the header (425). This allows other receivers (a system will generally have a pool of receivers for a given time queue) to check and sleep until the next message expires. Thus, when this expiration happens, all the receivers will wake up and the first one to get the lock on the header will process the expired message. The rest of the receivers will block on the lock request queue until the winning receiver unlocks the header. At this point, the next receiver in line will check the time of the new next unread message and either process it if it has expired or go back to sleep until it expires.

The notification process is implemented using another CIFS feature: clients on different nodes in the system can each register to be notified if attributes of a given file in a time queue change. Each queue has a directory service attribute that contains a path to a notification file for that queue. The time queue clients that call the receive method of the time queue are registered by the receive method to receive notification if attributes of the queue's notification file change. When a client deposits a message in the queue that is newer than the previously newest entry, the send method sets an attribute on the notification file. This causes all the clients blocked inside the receive method, regardless of what node they are running on, to be awakened and notified of the new entry, and each can attempt to lock the queue and examine that entry. If it is not yet time to process the earliest entry, each receiver will put itself to sleep until that time, as has been described. However, notification can be implemented by any other mechanism that can operate in conjunction with the time queue methods to provide registration of receivers and notification that awakens registered receivers when an entry is added to a queue.

Among its many potential applications, the time queue system described above can be used, for example, to implement a wake-up call system of the kind found in hotels. In such an implementation, the time queue messages contain information about a guest's wake-up call, with certain file attributes such as wake-up time, the delivery or expire time, and number of repeat calls. The time queue itself is located on an NAS device and is implemented with a notification file, a message directory, and a kernel file as discussed above. A wake-up time queue might proceed as follows:

(1) A hotel guests provides wake-up call information to be placed in the time queue. This can be done through a telephone keypad, for example.

(2) A sender client calls a send method, which creates a message with the specific wake-up time and other desired attributes of the guest, attempts to lock the kernel file header until successful, retrieves a vacant slot for the message information and inserts the message entry and link information for the entry, changes an attribute of the notification file, and creates a message file in the message directory to hold the contents of the wake-up call message.

(3) The attribute change will cause a notification to be sent to all receiver clients that want to be notified.

(4) Receiver clients will wake up when they receive a notification or when their sleep time expires. When either occurs, each of these receiver clients calls a receive method, which attempts to lock the kernel file header. When a lock is granted, if there is an unread wake-up message for the current or a past time at the top of the queue, the receiver client removes the message removed from the top of the unread list, unlocks the file header, and starts to process the message, i.e., to wake-up the hotel guest. When the wake-up call has been made, the receiver client calls an acknowledge method that notifies the time queue that the guest has been called and marks the corresponding slot as empty. After a receiver client has processed and acknowledged a message, as well as if a receiver client does not find an unread wake-up message ready to be processed, the receiver client sets its sleep time and goes to sleep until the wake-up time of the message at the top of the queue.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, the operations performed by the client-invoked queue methods can be packaged in different ways while still allowing the clients to invoke the operations separately. Priorities other than desired delivery times can be used, or the queue can operate without priorities in a first-in, first-out fashion. The notification file can be a directory and notification posting can be done by adding a file to that directory. The notification file can contain data and notification posting can be done by adding data to or changing data in the notification file. In an alternative and less preferred embodiment, the file system can be implemented on a file server. Accordingly, other embodiments are within the scope of the following claims.

What is claimed is:

1. A method comprising:
    attempting by a first client to lock a header of a kernel file to prevent simultaneous access by other clients, wherein the kernel file is included in a queue, implemented in a queue data structure, and has one or more slots to accommodate entries in the queue, the header comprising: a count of a number of empty slots in the kernel file, a count of a number of slots in the kernel file that are either being filled or read by a client, a count of a total number of slots in the kernel file, an offset of a first slot that is ready to be read by a client, an offset of a first empty slot, and a queue priority of the first slot;
    obtaining by the first client a lock of the header;
    retrieving by the first client a first unread queue entry from one of the slots;
    unlocking by the first client the header;
    reading by the first client the first unread queue entry; and
    storing the first unread queue entry at the first client.

2. The method of claim 1, wherein:
    the queue is a time queue;
    each queue entry is a message;
    each queue entry file is a message file; and
    each queue entry has a queue priority, the queue priority being a delivery time of the queue entry message.

3. The method of claim 1, wherein the queue data structure comprises:
    a directory for storing queue entry files; and
    a notification file.

4. The method of claim 3, wherein the directory for storing queue entry files is a message directory.

5. The method of claim 1, wherein each slot is organized into one of three virtual groups comprising:
    a group for empty slots that are empty and ready to receive a message;
    a group for unread slots that each contain an unread message waiting to be read by a client; and
    a group for pending slots that are either being filled by a client or are being read by a client.

6. The method of claim 1, further comprising:
    receiving a new queue entry from a client;
    storing a new queue entry in the queue in a list of unread queue entries; and
    posting a notification in a notification file.

7. The method of claim 1, wherein the queue data structure is implemented in a file system employing a CIFS protocol.

8. The method of claim 7, wherein the file system is implemented as a native file system on a fault tolerant, network attached storage (NAS) device.

9. The method of claim 8, wherein the NAS device is a RAID device.

10. A method comprising:
    locking a header of a kernel file by a first client, wherein the kernel file is included in a time queue and has one or more slots, the header comprising: a count of a number of empty slots in the kernel file, a count of a number of slots being filled or read by a client, a count of a total number of slots in the kernel file, an offset of a first slot that is ready to be read by a client, an offset of a first empty slot, and a queue priority of the first slot;
    inserting into one of the slots an entry which is newer than any other entry in the time queue;
    unlocking by the first client the header;
    changing an attribute of a notification file, thereby waking a second client;
    locking the header by the second client;
    reading by the second client the entry; and
    storing the entry at the second client.

11. The method of claim 10, further comprising:
    retrieving by the second client the entry; and
    unlocking the header.

12. The method of claim 10, wherein the time queue is implemented in a time queue data structure, which is employed in a file system maintaining files on a fault-tolerant platform, the file system coupled for communication with a network operable to perform file operations requested over the network, the file system providing strictly enforced, network-wide file locks.

13. The method of claim 12, wherein the clients are in communication with the network.

14. A computer program product having a computer readable medium having computer logic recorded thereon comprising:
    code stored on a computer readable medium, which when executed would cause the computer to:
    attempt by a first client to lock a header of a kernel file to prevent simultaneous access by other clients, wherein the kernel file is included in a queue, the header comprising: a count of a number of empty slots in the kernel file, a count of a number of slots that are either being filled or read by a client, a count of a total number of slots in the kernel file, an offset of a first slot that is ready to be read by a client, an offset of a first empty slot, and a queue priority of the first slot;
    obtain by the first client a lock of the header;
    retrieve by the first client a first unread queue entry from one of the slots;
    unlock by the first client the header;
    read by the first client the first unread queue entry; and
    store the first unread queue entry at the first client.

* * * * *